US006804627B1

United States Patent
Marokhovsky et al.

(10) Patent No.: US 6,804,627 B1
(45) Date of Patent: Oct. 12, 2004

(54) SYSTEM AND METHOD FOR GATHERING AND ANALYZING DATABASE PERFORMANCE STATISTICS

(75) Inventors: Serge G. Marokhovsky, Upton, MA (US); Shuzi Chen, Newton, MA (US); Sadasiva K Prathab, Hopkinton, MA (US); Anthony Ward, Pensacola, FL (US)

(73) Assignee: EMC Corporation, Hopkinton, MA (US)

( * ) Notice: Subject to any disclaimer, the term of this patent is extended or adjusted under 35 U.S.C. 154(b) by 22 days.

(21) Appl. No.: 10/335,329

(22) Filed: Dec. 31, 2002

(Under 37 CFR 1.47)

(51) Int. Cl.[7] .............................................. G06F 17/30
(52) U.S. Cl. ................... 702/182; 707/103 R; 707/200; 709/224
(58) Field of Search ............................... 702/182, 185, 702/186; 700/174–178; 707/103, 200, 201; 709/224; 455/427; 342/41

(56) References Cited

U.S. PATENT DOCUMENTS

| | | | | |
|---|---|---|---|---|
| 6,035,306 A | * | 3/2000 | Lowenthal et al. | 707/200 |
| 6,052,694 A | * | 4/2000 | Bromberg | 707/200 |
| 6,282,570 B1 | * | 8/2001 | Leung et al. | 709/224 |
| 6,405,212 B1 | * | 6/2002 | Samu et al. | 707/103 R |

* cited by examiner

Primary Examiner—John Barlow
Assistant Examiner—John Le
(74) Attorney, Agent, or Firm—Barry W. Chapin, Esq.; Chapin & Huang, LLC

(57) ABSTRACT

Database performance assessment typically entails logging and capturing utilities which tend to gather large quantities of unwieldy data leading to a cumbersome and indefinite analysis. A system and method for database performance analysis includes periodic sampling of pending database requests, rather than exhaustive monitoring and capturing all database access traffic, to identify areas of contention. A database access queue is periodically sampled, or scanned, to gather a snapshot of pending requests of database transactions. Pending requests are aggregated by an aggregating process which aggregates, the samples with previous samples corresponding to the same transaction. Correlating the aggregated samples identifies transactions which have been pending the longest and identifies tables and segments in the database which have a relatively high number of pending transactions. By periodically sampling, rather than exhaustively logging all requests, CPU intrusiveness is minimized, trivial, benign transactions are eliminated from the output, and the most burdened tables and segments are identified to enable a database administrator to make informed decisions about remedial actions.

31 Claims, 8 Drawing Sheets

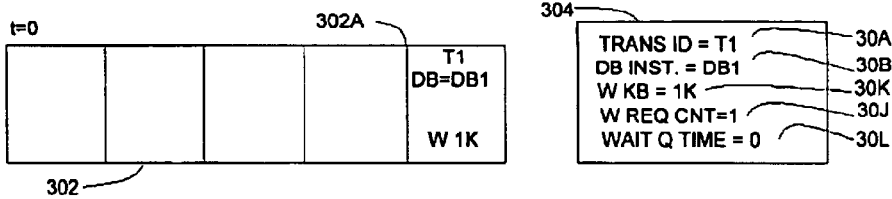
FIG 9A
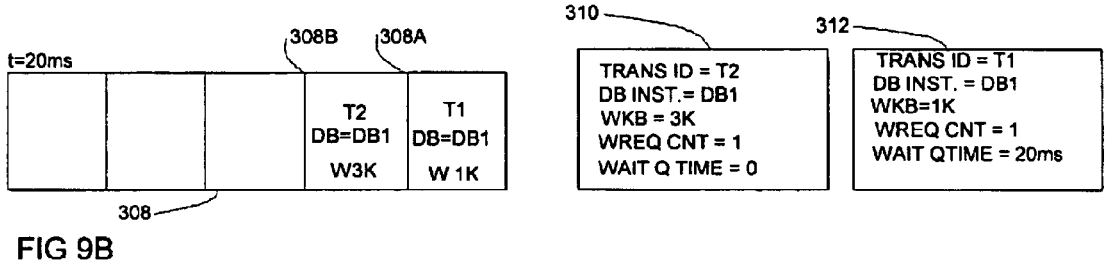
FIG 9B
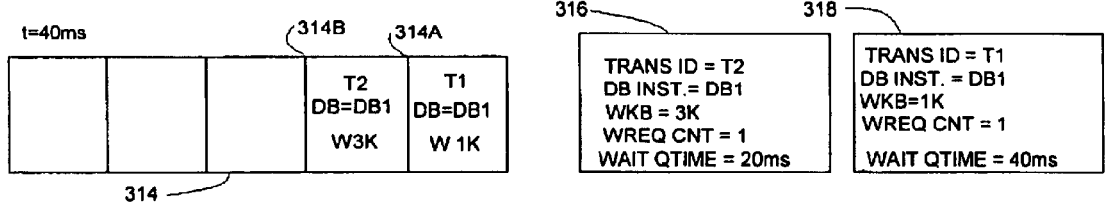
FIG. 9C
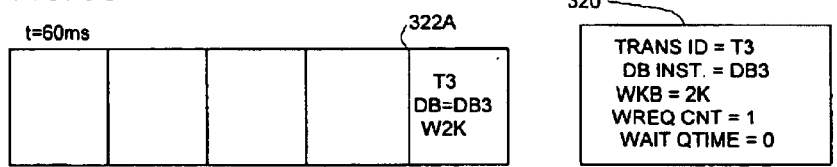
FIG. 9D
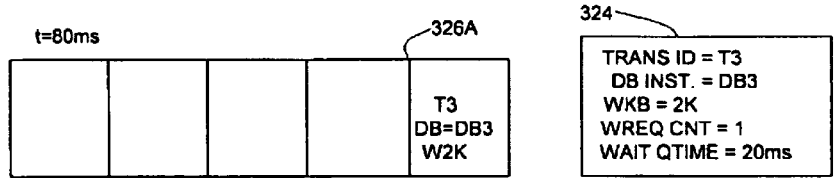
FIG. 9E
| DB INSTANCE | AVG KB READ | WRITE AVG MS | TOTAL WRITES |
|---|---|---|---|
| DB1 | 2K | 30ms | 2 |
| DB3 | 2K | 20ms | 1 |
FIG. 10

SYSTEM AND METHOD FOR GATHERING AND ANALYZING DATABASE PERFORMANCE STATISTICS

BACKGROUND OF THE INVENTION

Conventional database management applications organize and store large amounts of data according to a predetermined normalization and indexing manner to allow efficient update and retrieval by a user. In a typical relational database, the data is organized according to tables on a logical level, and further subdivided into physical disks, files, extents and segments. Further, a particular database operation often includes multiple tables via joining or linking the tables by using key fields. Also, a single table may be spread across multiple disks or files, due to volume or access contention constraints.

Accordingly, a single database query may invoke a number of database I/O requests to a plurality of database resources, such as disks, files, tables and extents. Further, I/O requests triggering a physical device access tend to be particularly burdensome operations in a database management application because of disk seek and latency time. Contention among multiple users attempting to simultaneously access a database, therefore, can result in contention for the common database resources, such as disks and files, resulting in a bottleneck for access to the common resource.

While proper database design and resource allocation purports to balance the expected demand load, at least initially, database contention and the resulting bottlenecks represent an ongoing maintenance issue. Changes in the number of users, increases in the quantity of data stored, and the method of access (i.e. LAN throughput, remote Internet access) can affect the demand load placed on database resources. Further, disks and files can become fragmented and extended over time, thereby causing a table or file to migrate to different physical areas, and increasing the likelihood of incurring additional read and latency access time.

Accordingly, conventional methods are known for tracking database access attempts and providing output indicative of database operations. Conventional systems employ event logging, log files, media utilization graphs, high water marks and CPU utilization graphs to track database usage and isolate potential or actual bottlenecks. These conventional methods typically provide a graphical or textual output format that an operator or field service technician can interpret in an attempt to assess database resource contention.

SUMMARY

Conventional database analysis methods suffer from a variety of deficiencies. In general, conventional methods typically generate output that is too voluminous and unweildly to be analyzed effectively, or are prohibitively intrusive such that normal database throughput suffers from the monitoring overhead. In particular, the methods outlined above tend to generate log files, which dump an indication of each database access attempt. A typical conventional event logger or log file will generate a very large text or other type of file identifying each transaction over a data gathering period. Typically, these conventional files contain extraneous data such as system operations and access to tables or files which are not the subject of the analysis, in addition to pertinent database table accesses. Additionally, the conventional systems perform a subsequent analysis operation of the raw data that imposes a lag time on the output result, hindering any ability to obtain real time feedback on database performance.

Often, conventional database tracking entries are written with such frequency that the CPU overhead required hinders overall system performance. Conventional graphical analysis, such as CPU utilization graphs and disk utilization graphs, can also entail substantial overhead. Also, during processing of conventional database statistics systems, other computer system activities tend to affect CPU usage in addition to access to the database tables or files for which information is sought, thereby skewing the results of such a CPU or disk graph.

To illustrate an example of deficiencies posed by conventional database analysis methods, consider an operator establishing a log file for access to a database table. The operator designates an hour of log time. The operator is focused on database accesses to a certain table, but many tables are frequently accessed in the logged database instance. Consider further that each user access transaction results in an acknowledgement from the disk and a confirmatory update to an index. Accordingly, the conventional logging process generates three entries for each access transaction for all tables, resulting in a large, unwieldy log file.

The operator can access the resulting unwieldy data in the log file several ways using conventional systems. One conventional technique involves manual inspection of the log file by table name and may yield the transactions initiated for the particular table, but the operator will need to examine many other entries and may inadvertently skip entries in the voluminous hardcopy while scanning for the proper table name. A conventional parser could analyze the log file automatically, but the operator must manually develop the procedure to parse the log file and look for the table name. The operator may be able to modify the conventional logging procedure to selectively log certain entries, however, this approach also requires manual coding of procedures.

Embodiments of the invention are based in part, on the observation that it would be beneficial to provide a database performance gathering and analysis tool to retrieve database requests without gathering substantial extraneous data and without unduly burdening the database or the CPU with the resources required to execute the tool itself. Configurations of the present invention significantly overcome deficiencies with the above conventional methods and provide such a solution. In particular, embodiments of the invention provide mechanism and techniques that include a method for processing database performance statistics that includes periodic sampling of pending database requests, rather than exhaustively monitoring and capturing all database access traffic, to identify areas of contention. The sampling is done in sample/sleep intervals that occur for a predefined time period such as 20 seconds for each database instance. The cycle of sampling different database instance can repeat, for example, every two minutes for a total sampling time of 30 minutes. By using a unique embedded set of sample sequences for different instances of a database, embodiments of the invention can obtain an accurate indication of performance bottlenecks to various database resources of different database instances.

During this sampling process, the system of the invention periodically samples or scans a database access queue to gather samples of pending requests corresponding to database transactions. An aggregating component receives the sampled requests and aggregates the samples with previous samples corresponding to the same transaction. Correlating the aggregated samples identifies transactions that have been pending the longest and identifies database objects, such as files, tables and segments, which have a relatively high number of pending transactions. By periodically sampling, rather than exhaustively logging all requests, embodiments of the invention significantly reduce or minimize CPU intrusiveness and significantly eliminate trivial and benign transactions from the output. Further still, embodiments of the invention identify the most burdened database objects to enable a database administrator to make informed decisions about remedial actions to correct database performance issues. Also, by sampling using a sampling structure that is then "dumped" out to the aggregating structure, continuously pending transaction progress can be tracked over multiple sample iterations.

The database performance gathering and analysis tool of this invention therefore substantially pinpoints areas of contention in the database, allowing a database administrator or other operator to pursue quantitative and deterministic remedial actions, rather than trial-and-error load balancing or priority adjustments based on perceived visual trends in voluminous amounts of data. The data so gathered can be targeted so as to collect information about tables, DB instances, particular users, or other granularity so as to enable database administrators detect patters of usage and trends for tuning the database accordingly.

Specifically, one particular configuration and embodiment provides a toolkit that performs a method for gathering and analyzing database performance events comprising sampling, at a predetermined sampling time interval, metrics of database performance statistics (database performance statistics) indicative of pending database requests. The method further includes building, for each of the pending database requests, a scope structure including the sampled database performance statistics in the pending database requests to generate a set of snapshots of database requests. A global accumulator accumulates transaction entries indicative of the database transactions, and accumulates the scope structures of database requests to correlate the current pending database requests. A transaction ID identifies current pending transaction with transaction entries in the global accumulator corresponding to previous pending database requests for the same transaction.

Embodiments of the invention further generate the scope structure snapshots from queues of database requests. The sampling operation comprises scanning a queue for the pending database requests, and reading database performance statistics for the entries in the scanned queue. An aggregating component employs a transaction identifier indicative of the pending transaction and correlates, by indexing into the global accumulator, the pending transaction to determine if a transaction entry in the global accumulator corresponds to the pending transaction. The aggregating component then creates, if a corresponding transaction entry is not found in the global accumulator, a transaction entry corresponding to the pending transaction.

If a corresponding transaction entry is found, aggregating further includes comparing database performance statistics corresponding to the same transaction to compute aggregate parameters for the database performance statistics corresponding to the same transaction, such as the queue wait time and the number of pending requests in the queue.

At predetermined report intervals, typically 30 minutes, a report archive receives the accumulated transactions in the global accumulator, and a report output writer generates a report indicative of the analysis.

There may be several database instances analyzed simultaneously, each having a plurality of queues, wherein the sampling further comprises sampling a subset of selected queues from a plurality of queues corresponding to the database instances. The gathering component samples iteratively according to a predetermined sampling frequency cycle indicative of a periodic window in which to retrieve the database performance statistics. The samples are separated by sleep time interval such that the gathering component retrieves, for a predetermined sampling time, the database performance statistics. Following the sampling time, the gathering component idles for the duration of the sleep time interval such that database performance statistics are not retrieved during the idling to minimize CPU intrusion.

A data collection policy (DCP) specifies the predetermined intervals for the sampling, building, and the aggregating to mitigate the intrusiveness of the sampling. The DCP specifies the predetermined intervals such that transactions having a substantial impact on database throughput are identified in the scope snapshot and transactions having an insubstantial impact on database throughput are omitted from the scope structure snapshot. Accordingly, the DCP directs the system to provide real time analysis of data on a variety of granularity levels (e.g. per device, file, table or segment) over a variety of timing intervals (e.g. hourly, daily, weekly).

Therefore, the DCP is indicative of a series of nested timing intervals, in which the steps of sampling, building and aggregating repeat according to an instance sampling sequence and for a respective database instance. Each instance sampling sequence includes successive samples taken iteratively from the DB instance during a sampling frequency cycle. The global accumulator then indicates performance for transactions occurring during for the instance sampling sequence for that respective database instance. The instance sampling time sequence repeats for multiple database instances during a database sampling frequency cycle, thereby allowing collection of samples of database performance statistics for multiple database instances, and for respective database objects, and further, occurs repetitively over a nested database collection interval.

An output report, such as a histogram, graphically illustrates an aggregate result of the sampled database performance statistics to allow a user to identify performance characterized by server configuration, or database files or objects. A report writer coalesces aggregate parameters for multiple transactions for respective database objects from the global accumulator to produce an aggregate result of transaction performance for each respective database object for which performance characteristics are sought according to the DCP.

Embodiments of the invention include software programs that carry out the operations explained herein, as well as apparatus such as a computer system configured to perform the operations disclosed herein as embodiments of the invention. The invention may be embodied as software alone, or as software and hardware, or as a process executing or otherwise performing within a processor in a computer system.

It is to be understood that the system of the invention, although described above as a software toolkit, can be embodied strictly as a software program, as software and hardware, or as hardware alone, and may be implemented as a standalone process or set of processes, or linked and merged as part of a larger system. Example embodiments of the invention may be implemented within EMC's Control Center software application, marketed commercially from EMC Corporation of Hopkinton, Mass., which provides graphical management functionality for storage area network resources and in computerized devices that operate the Control Center software.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIGS. 9A–9E show an example of database performance characteristics gathering and analysis during a sampling frequency cycle; and FIG. 10 shows the global accumulator following the sampling frequency cycle shown in FIGS. 9A–9E.

DETAILED DESCRIPTION

Figure 1:
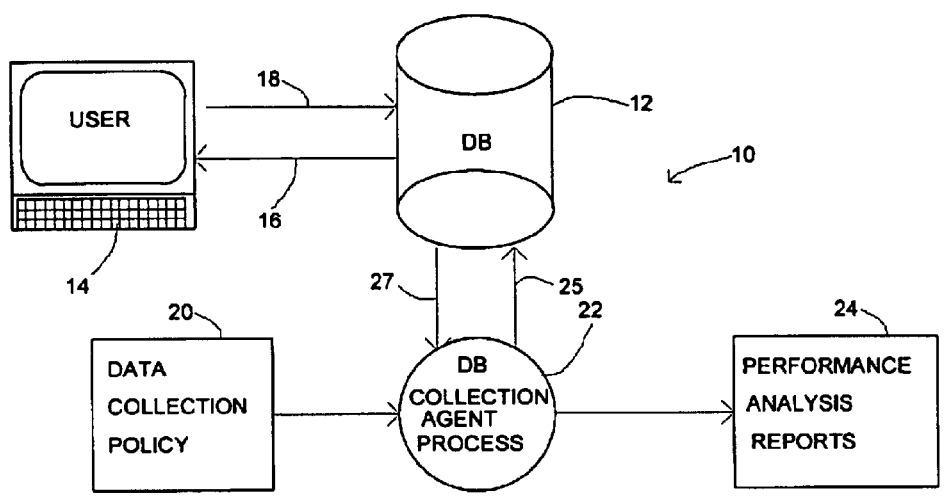
FIG. 1 is a block diagram of the database performance statistics gathering and analysis tool.

Embodiments of the invention provide techniques and mechanisms for performing database statistics collection and analysis. One example embodiment provides a method for processing database performance statistics and includes periodic sampling of pending database requests, rather than exhaustive monitoring and capturing all database access traffic, to identify areas of contention. The system periodically samples or scans a database access queue to gather samples of pending requests of database transactions. After sampling, the system aggregates pending requests by an aggregating component that aggregates the samples with previous samples corresponding to the same transaction, thus allowing long-lived transactions to be tracked in a single data structure. Aggregating the samples identifies transactions that have been pending the longest and identifies database objects, such as tables and segments in the database, which have a relatively high number of pending transactions. By periodically sampling, rather than exhaustively logging all requests, CPU intrusiveness is minimized, trivial and benign transactions are eliminated from the output, and the most burdened database objects are identified to enable a database administrator to make informed decisions about remedial actions.

In particular, the invention provides a non-intrusive way to retrieve a series of momentary "snapshots" of database requests waiting to be serviced. The database requests indicate the user issuing the request, the table to which it is directed, whether it is read or write, and the amount of data to be written, and other fields described further below. Additional fields may also be employed. As an example, the pending requests are stored in a queue, and a gathering process reads the momentary snapshots, or samples, repetitiously for a sampling time, such as, for example 20 seconds, each sample being followed by a sleep time of about 20 milliseconds. The sleep time ensures that the sampling does not overly burden the system with intrusive monitoring. The gathering process therefore reads a series of samples during the sampling time, which repeats during periodic sampling frequency cycle intervals, for example every 2 minutes. After sampling one database instance for the 20 second interval, other instances may be sampled during other portions of this two minute sampling window and thus the system of the invention allows collection of statistics from many instances of the same or different databases.

An aggregating component receives the samples from the gathering component, and matches the samples to previous samples for the same transaction. Therefore, the aggregating component can determine how many requests are pending for a particular database table or segment, and how long each request has been pending by adding the number of samples taken for a particular transaction. Since the aggregating component samples between the sleep time intervals, only transactions pending for some time tend to be included in a snapshot. Specifically, a transaction pending for three sample periods has been pending for between 40 and 80 milliseconds, given the above intervals. The gathering process might not even read transactions pending for less than 20 milliseconds, unless the request happened to arrive in the queue just prior to the beginning of a sampling, at the end of a sleep time interval.

However, the gathering process is attempting to gather only those transactions that have been pending a substantial length of time, to identify areas of contention and resulting bottlenecks. Requests pending only a short time are deemed to be relatively benign, and not a concern, and therefore need not clutter the output. Also, if a relatively brief request was caught in a snapshot, similar requests for the same database object likely would not be sampled during successive sample times. Conversely, if a particular object is substantially burdened, the gathering process will tend to read many samplings for the same transaction, thereby indicating a bottleneck. In this manner, the system can provide real time analysis of data on a variety of granularity levels (e.g. per device, file, table or segment) over a variety of timing intervals (e.g. hourly, daily, weekly), rather than merely generating large quantities of raw data for subsequent analysis.

FIG. 1 is a block diagram of the database performance statistics gathering and analysis tool. Referring to FIG. 1, a system 10 for employing the database performance statistics gathering and analysis tool is shown. A user 14 employs a database under observation 12 for routine database reads 16 and writes 18, as shown by the respective arrows. A test engineer or database administrator develops a data collection policy (DCP) 20 to target database objects, such as instances, tables, files, and segments for analysis within the database 12. A DB (database) collection agent process 22 receives the DCP 20 to determine the queues and intervals for which to apply the gathering and analysis, including sampling time, sleep time, frequency cycle time, and an archive report interval time, described further below with respect to FIG. 2. The collection agent process 22 queries the database queues, as shown by arrow 25, and samples snapshots of database performance statistics indicative of pending database requests, shown by arrow 27. The collection agent process 22 then aggregates and correlates the received samples 27. The aggregated samples 27 result in performance analysis reports 24 indicative of access performance to database instances and the associated tables and segments.

Figure 2:
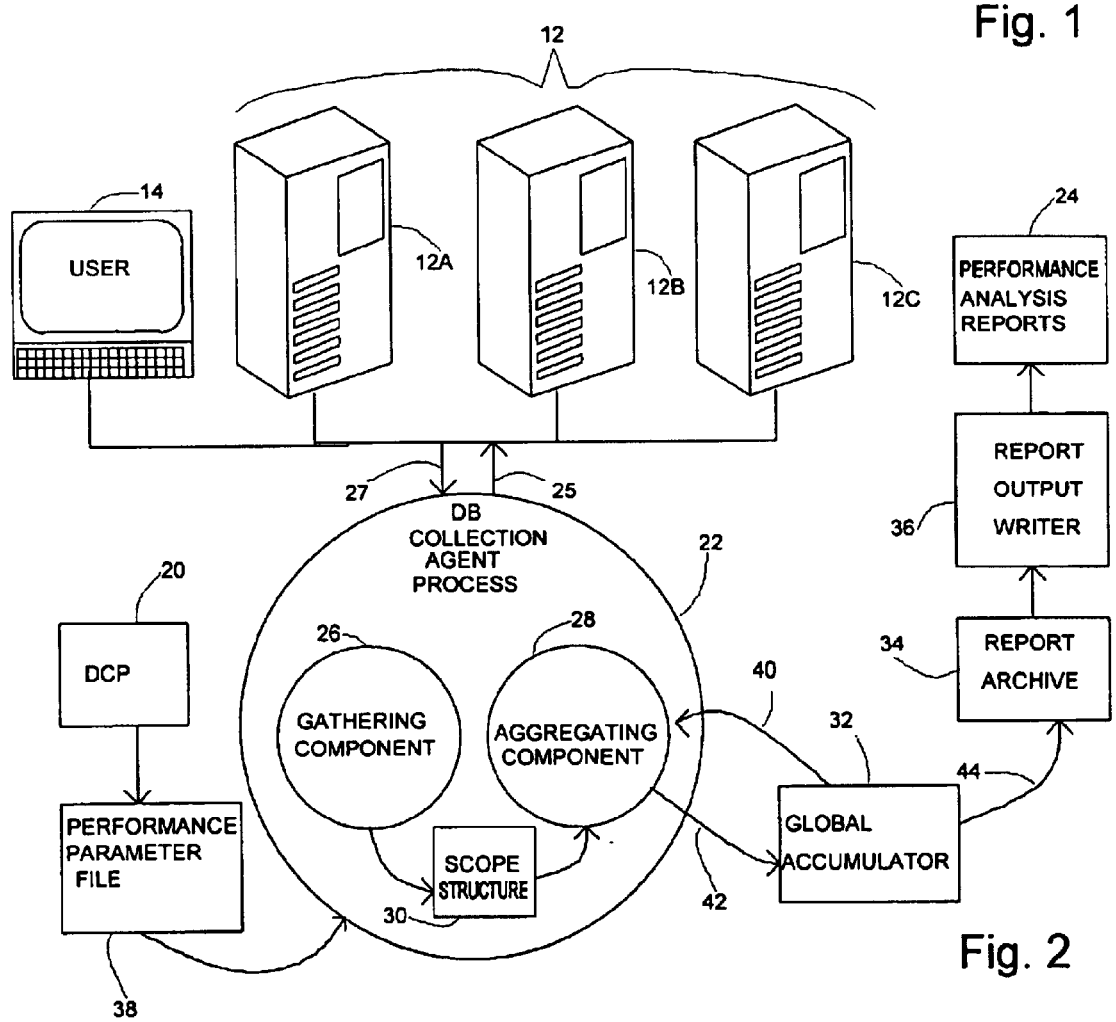
FIG. 2 is a dataflow diagram of the database performance analysis data.

FIG. 2 is a dataflow diagram of the database performance data gathering and analysis as performed in the system of FIG. 1. Referring to FIG. 2, the DB collection agent process 22 includes a gathering component 26 and an aggregating component 28. The DB collection agent process 22 reads the DCP 20 and an initial configuration parameter file 38, to determine the corresponding queues, intervals and other values. Note that the database 12 represents a plurality of database instances including physical and logical elements, such as storage devices 12A–12C, which contain the files, tables, segments, and extents. The DB collection agent process 22 scans the designated queues indicated in the DCP 20 via queries 25, and receives samples 27 of a set of snapshots, each corresponding to a particular pending request for a particular transaction. After each sample 27, the gathering component 26 writes each of the samples 27 to a scope structure 30, which stores the database performance statistics obtained from the snapshot.

The aggregating component 28 receives each scope structure 30, and determines a transaction ID corresponding to this and previous (if any) pending database requests for this transaction. The transaction ID identifies the currently pending database request as well as other sampled pending request for the same database transaction. Typically, the transaction ID includes owner name, table name, and DB instance, described further below, although other indexing may be employed. The aggregating component 28 receives transaction entries corresponding to the previously sampled database requests from the global accumulator 32, shown by arrow 40, and attempts to match the new scope structures 30 to the corresponding transaction entries.

If the aggregating component 28 finds a matching transaction ID, then it updates the transaction entry in the global accumulator 32 with the new scope structure 30, shown by arrow 42. Updating includes adding the wait time in the queue from the scope record 30 to the accumulated wait time in the global accumulator 32, and updating the number of pending requests for the particular table or segment sought by the transaction. If there is no corresponding existing transaction entry in the global accumulator, then the present pending request is new, and the aggregating component 28 creates a new transaction entry in the global accumulator 32, and stores the database performance statistics obtained from the pending request, shown by arrow 42.

Periodically, upon expiration of the DCP 30 report interval time, the aggregating component 28 sends the aggregated transactions in the global accumulator 32 to a report archive 34, as shown by arrow 44. A report output writer 36 invokes the report archive 34 to generate the performance analysis reports 24, shown and described further below with respect to FIGS. 7 and 8. Note that the aggregation of the scope structures 30 to correlate the samples to transactions, and the transmission of the aggregated transactions to the report archive, need not track the gathering sequence described above. In alternate arrangements the scope structures may alternatively be buffered and stored by any suitable means, as is known to those skilled in the art, and the aggregating and reporting performed at another suitable time.

It should further be noted that the global accumulator 32 is shown here as exemplary, and the global accumulator 32 and report archive 34 may be implemented as a separate data structure or data store, as a data structure within the DB collection agent process 22, or other suitable means. Similarly, the report writer may be a standalone process, or may be periodically instantiated or invoked by the DB collection agent process 22, without deviating from the spirit and scope of the claimed invention.

Figure 3:
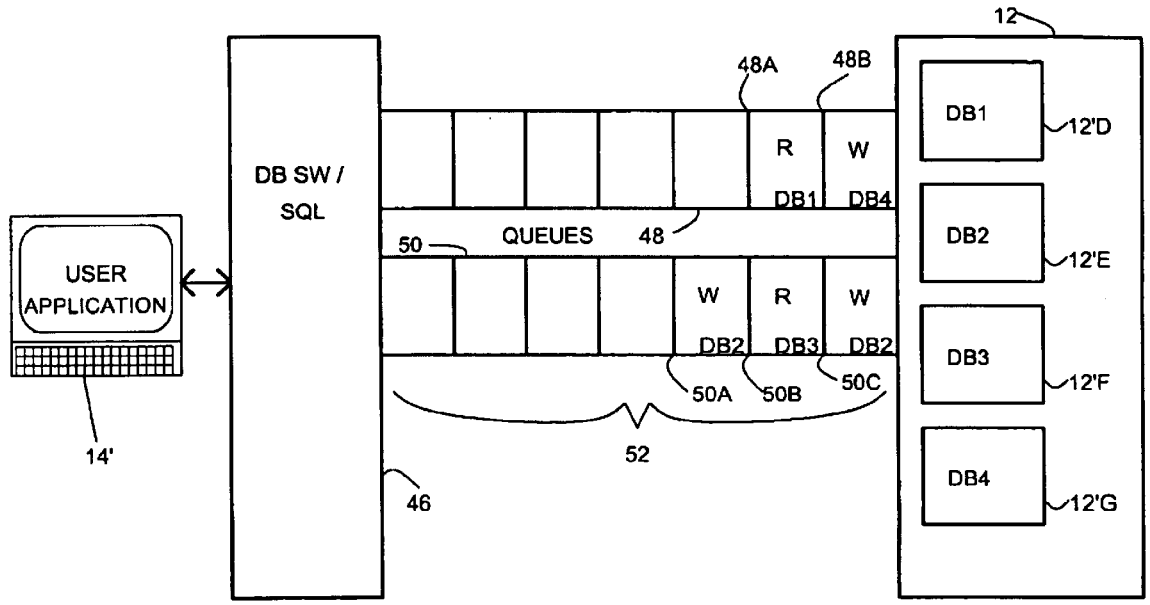
FIG. 3 shows the database queues and databases instances operable to be analyzed.

FIG. 3 shows database queues and instances of databases as included in a typical system architecture operable for performance processing and analysis by the tool. Referring to FIGS. 3 and 2, the term database 12 is employed to refer to one or more database instances 12'D–12'G. As indicated above, the database 12 includes a plurality of physical and logical entities, such as physical storage array devices (12A–12C, FIG. 2), each including database instances 12'D–12'G (DB1–DB4). Further, each of the database instances 12'D–12'G may further comprise files, tables and segments. The database instances 12'D–12'G shown herein are exemplary, and represent a logical database which is operable to include such files, tables, and segments stored across one or more physical storage array devices 12A–12C. Alternate configurations may employ other arrangements.

The DB collection agent process samples a plurality of queues 48 and 50, each corresponding to particular types of requests, such as I/O requests, system resource requests and lock requests. During processing, a user application 14' issues database requests via a SQL or other suitable DB software interface 46 linked with the user application 14.' The DB interface 46 translates the calls from the user application 14' into queued database requests 48A–B and 50A–C in the respective queues 48 and 50. The queued requests 48A–B and 50A–C include an exemplary indication of read or write (R, W) and a database instance. The collection agent process 22 samples a snapshot 52 of each of the queues 48, 50, during the corresponding sampling frequency cycle as specified by the DCP 20.

Figure 4:
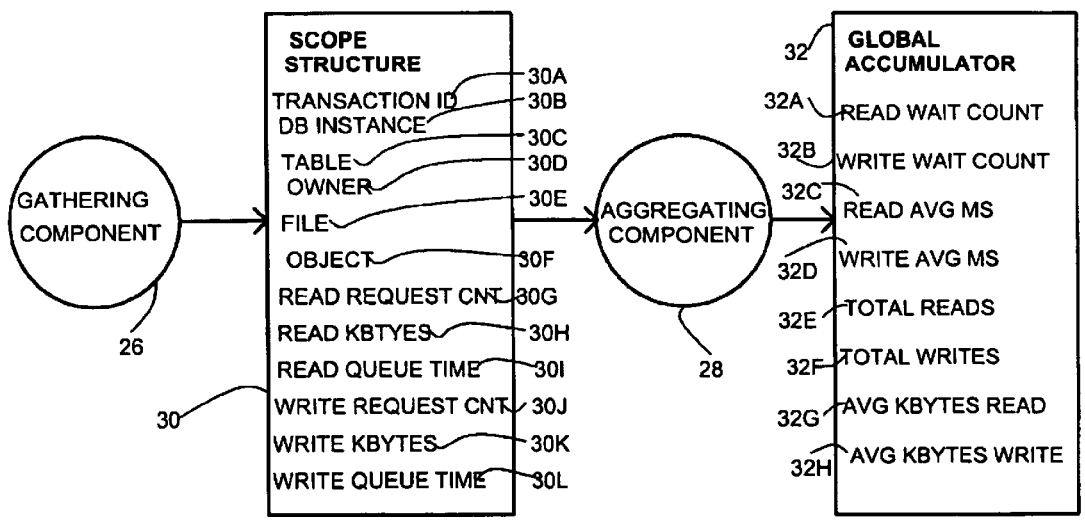
FIG. 4 shows the scope structure and global accumulator of FIG. 2 in greater detail.

FIG. 4 shows the scope structure 30 and global accumulator 32 of FIG. 2 in greater detail. Referring to FIG. 4, the gathering component 26 samples the pending database requests to obtain the database performance statistics 30A–30L contained therein. The gathering component 26 reads the database performance statistics 30A–30L and stores the parameters, for each pending database request, in an instantiation of the scope structure 30. Specifically, the parameters stored may include, but are not limited to, Transaction ID 30A, DB Instance 30B, Table 30C, Owner 30D, File 30E, Object 30F, and for both reads and writes, Request Count 30G and J, Kbytes(size) 30H and K, and Time in Queue 30I and L.

The aggregating component 28 reads the scope structure 30 and attempts to find a corresponding entry in the global accumulator 32. Alternatively, the aggregating component 30 creates a new statistics entry in the global accumulator 32 if no previous statistics entries corresponding to the gathered scope structure 30 are found. The global accumulator is a table having an entry for each DB transaction, and distinguishes the pending requests by a tuple of DB Instance 30B, Owner 30C, and Table 30D. Note that the DB transaction refers to a DML event such as an insert/update/delete/select or other performance related event, and will generate several performance entries if it is pending a sufficient time. Alternate configurations may employ a generated identifier or other transaction ID 30A operable to map and distinguish successive samples of pending requests for the same DB transaction.

The aggregating component 28, once finding a transaction entry corresponding to a scope structure 30 or determining the occurrence of a first scope structure 30 for a transaction, writes the new or updated values into the corresponding entry in the global accumulator 32. Specifically, the aggregating component 28 writes the Read Wait Count 32A, Write Wait Count 32B, Read Average ms 32C, Write Average ms 32D, Total Reads 32E, Total Writes 32F, Average Kbytes Read 32G and Average Kbytes Write 32H.

Figure 5:
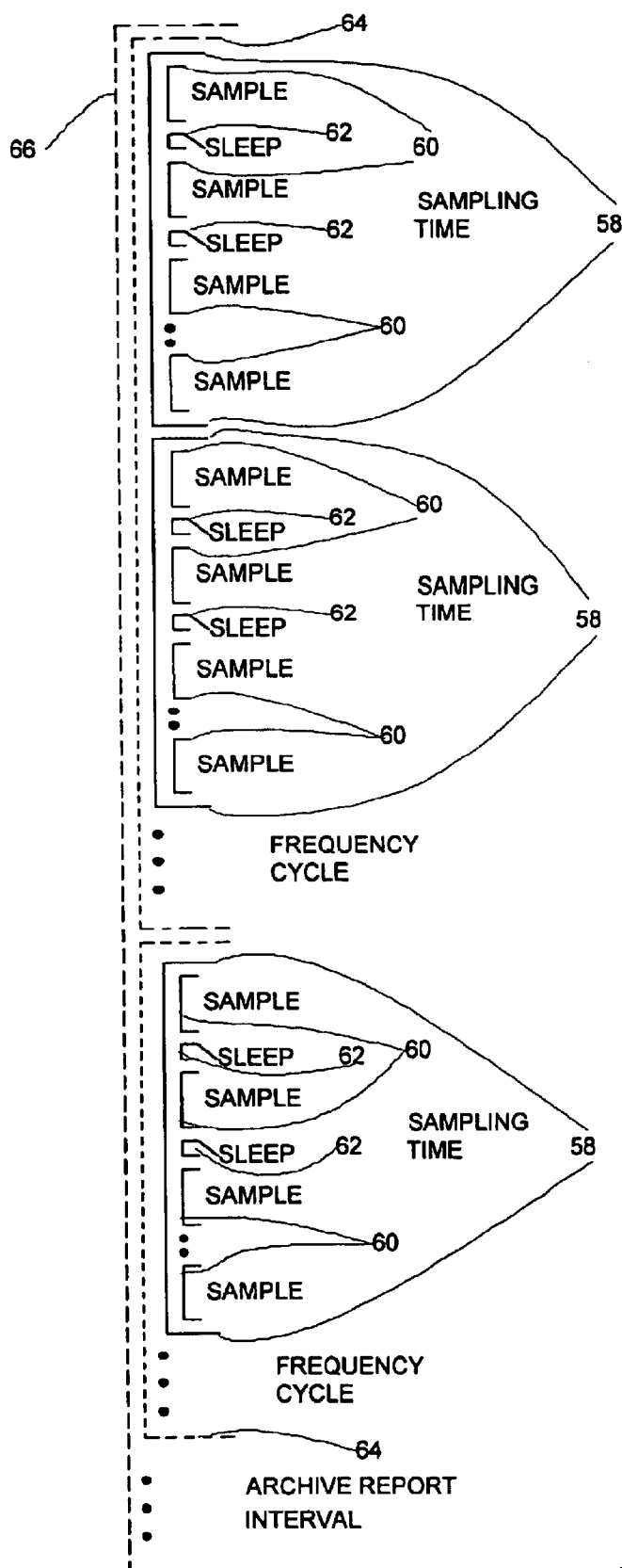
FIG. 5 shows a timing chart of the data gathering and analysis in the database agent collection process.

FIG. 5 shows a timing chart of the data gathering and analysis in the database agent collection process. Referring to FIGS. 5 and 2, a plurality of nested time intervals are employed during the gathering and analysis of the database performance statistics. Specifically, the intervals include a sampling time 58 interval indicative of an interval during which the agent 22 reads successive samples 60, such as 20 seconds; a sleep time 62 interval indicative of an idle period between successive samples 60, such as 20 milliseconds; a frequency cycle 64 time interval indicative of the frequency of successive sample times, such as every 2 minutes; and an archive report interval 66 indicative of a period over which to report the aggregated sample data, such as 30 minutes.

As indicated above, the sleep time 62 interval ensures that the collection agent process 22 does not intrusively monitor database operation to the point of depriving other processes of CPU time. The sampling occurs iteratively during an instance sampling sequence defined by the sampling time 58, and is followed by the sleep time 62. The duration of each sample 60 taken during the sample time 58 depends on the number and size of queues sampled. The instance sampling sequence repeats each frequency cycle 64 for each DB instance, and the collection agent process 22 may sample other database instances during another frequency cycle 64, or may remain idle. Given the above interval values, a collection agent process could sample up to six DB instances during a frequency cycle (20 sec.*6=2 min.). The archive report interval 66 determines when the DB collection agent process 22 aggregates the performance entries in the global accumulator 32. The collection agent process 22 builds the aggregate results and sends it to the report output writer 36, via the report archive 34, such that the report writer 36 will generate a report on the aggregated data representing the transactions aggregated during the archive report interval 66.

The values for sampling time 58 interval, sleep time 62 interval, frequency cycle 64 interval and archive report interval 66 defined herein are exemplary; other values may be employed in alternate arrangements without departing from the invention as defined by the present claims. Further, the global accumulator 32 may aggregate the scope structures according to transactions at the end of each sampling time 58, after each frequency cycle 64, or after an archive interval 66 has completed. The report output writer 36 employs the aggregated data from the report archive to identify transactions targeting a specific database object, such as a file, table, or segment, and accordingly, may receive the transaction data incrementally or as a discrete unit without departing from the invention as defined by the present claims.

Figure 6A:
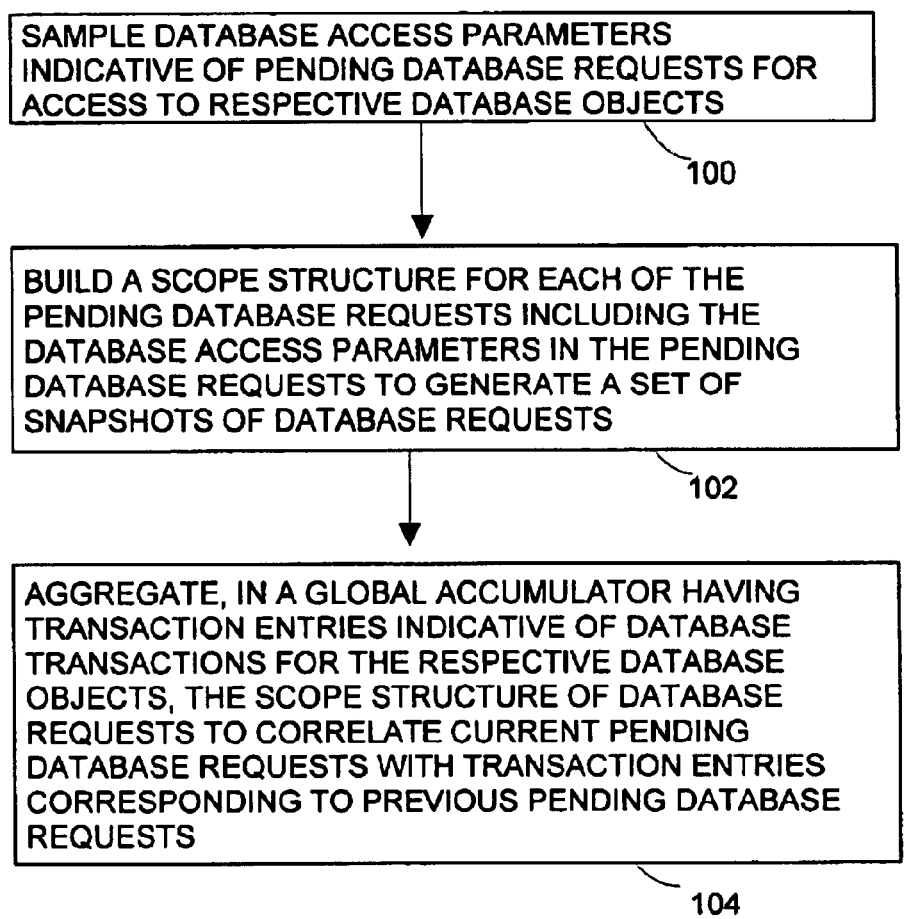
FIG. 6A shows a flowchart of database performance data gathering and analyzing.

FIG. 6A shows a flowchart of database performance data gathering and analyzing. Referring to FIGS. 6A and 2, the DB collection agent process 22 samples, at the predetermined sampling time 58 interval, a set of database performance statistics 27 indicative of pending database requests for access to respective database objects, as depicted at step 100. The collection agent 22 process then builds, for each of the pending database requests, a scope structure 30 including the sampled database performance statistics in the pending database requests to generate a set of snapshots of database requests, as disclosed at step 102. The collection agent process sends or writes the scope structures 30 to the global accumulator 32 to aggregate transaction entries indicative of database transactions for the respective database objects, to correlate current pending database requests with transaction entries already stored in the global accumulator 32 and corresponding to previous pending database requests for the same transaction for the respective database objects, as shown at step 104.

Figure 6B:
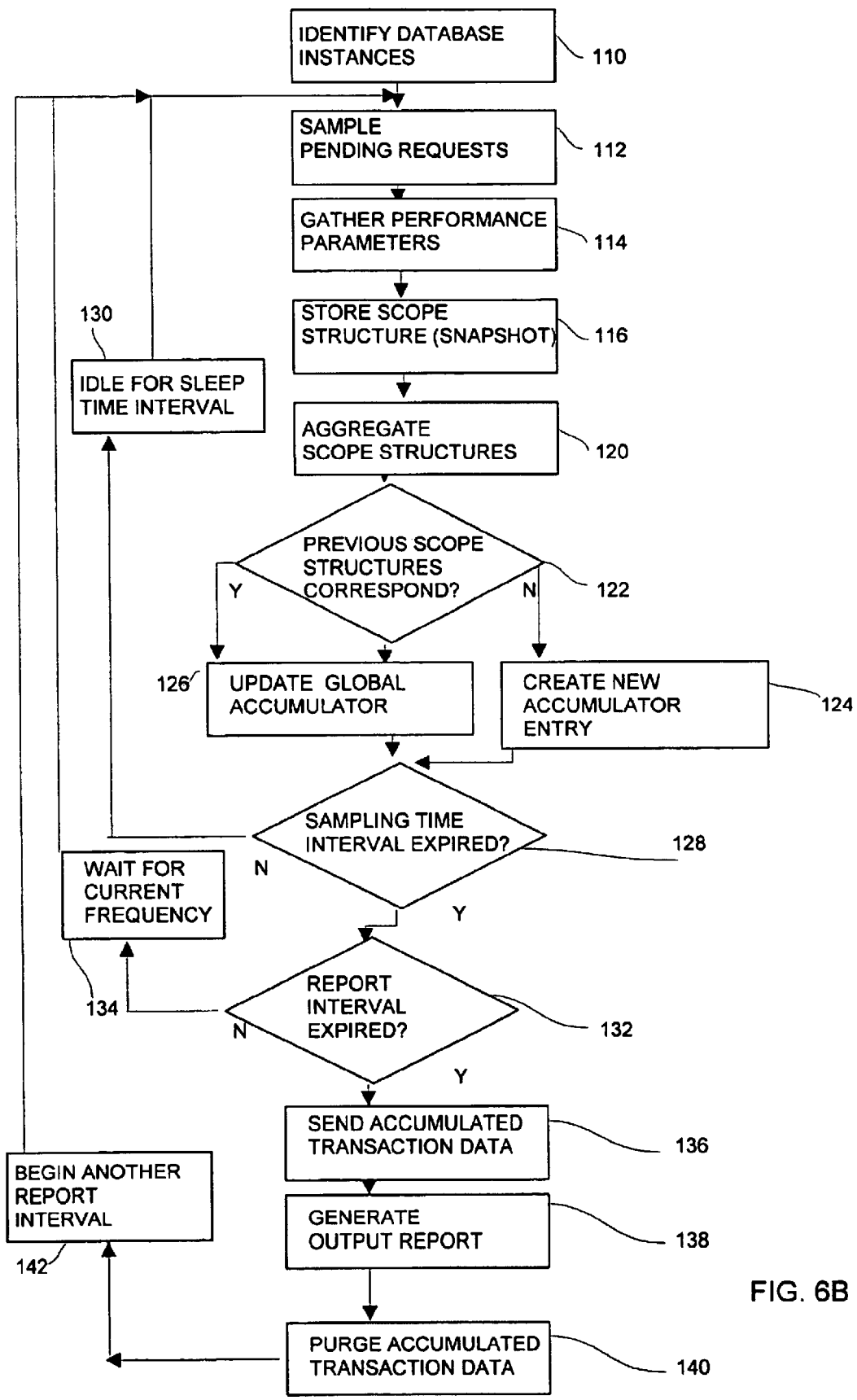
FIG. 6B shows the flowchart of FIG. 6A in greater detail

FIG. 6B shows a further flowchart of database performance data gathering and analyzing in more detail. Referring to FIGS. 6b and 2–4, the collection agent process 22 identifies a set of database instances 12'D–12'E for analysis, as depicted in step 110. Each of the identified database instances has a set of queues 48, 50 corresponding to pending requests 48A–B, 50A–C. The collection agent process samples, during the sampling time interval, pending requests 48A–B, 50A–C in at least some of the queues 48, 50 according to the data collection policy (DCP) 20, as shown at step 112. The collection agent process 22 gathers performance parameters 27 indicative of database performance for each of a set of the pending requests 48A–B, 50A–C, as disclosed at step 114, and stores, in the scope structure 30, the performance parameters indicative of pending requests 48A–B, 50A–C in the sampled queue, as depicted at step 116. The collection agent process 22 waits, for the duration of the sleep time interval specified in the initial configuration file 38 prior to subsequent sampling of the database, as disclosed at step 118. The sleep time 62 interval prevents intrusion on database throughput due to excessive sampling queries. The global accumulator 32 aggregates the scope structures 30 based on a transaction identifier such that subsequent scope structures 30 are correlated with snapshots of previous scope structures 30 corresponding to the same pending requests, as described at step 120. A check is performed to determine if a previous scope structure 30 corresponds to the transaction identifier in the current scope structure 30, as disclosed at step 122. If a corresponding transaction identifier 30A is not found for previous scope snapshots for the pending request, the aggregating component creates a new global accumulator 32 entry indicative of the newly pending request, as depicted at step 124. If a corresponding transaction identifier 30A is found to correspond to the current scope structure 30, the collection agent process 22 updates the global accumulator 32 entry corresponding to the pending request, as shown at step 126. Note that the transaction ID may be comprised of DB instance 30B, table 30C and owner 30D as indicated above, or may be another unique indicator of the corresponding transaction. A check is performed to determine if the sampling time 58 interval has expired, as disclosed at step 128. If the current sampling time 58 interval has not expired, then the collection agent process 22 idles for the duration of the sleep time 62 interval, as shown at step 130, following which control reverts to step 12. If the current sampling time 58 interval has expired, then a check is performed to determine if the current DB archive report interval 66, for the particular DB instance being sampled, has expired, as depicted at step 132. If the DB archive report interval 66 has not expired, then the collection agent process 22 waits until the current frequency cycle 64 ends and begins a new frequency cycle 64, as depicted at step 134, and control reverts to step 112. If the current DB archive report interval 66 has expired, then the global accumulator 32 sends the accumulated transaction data to the report output writer 36, as depicted at step 136.

The report output writer 36 generates an performance analysis report corresponding to the accumulated transaction data, as disclosed at step 138 and discussed further below with respect to FIGS. 7 and 8. The collection agent process 22 purges the accumulated transaction data, as shown at step 140, and control reverts to step 112 to begin another archive report interval, as depicted at step 142.

Figure 7:
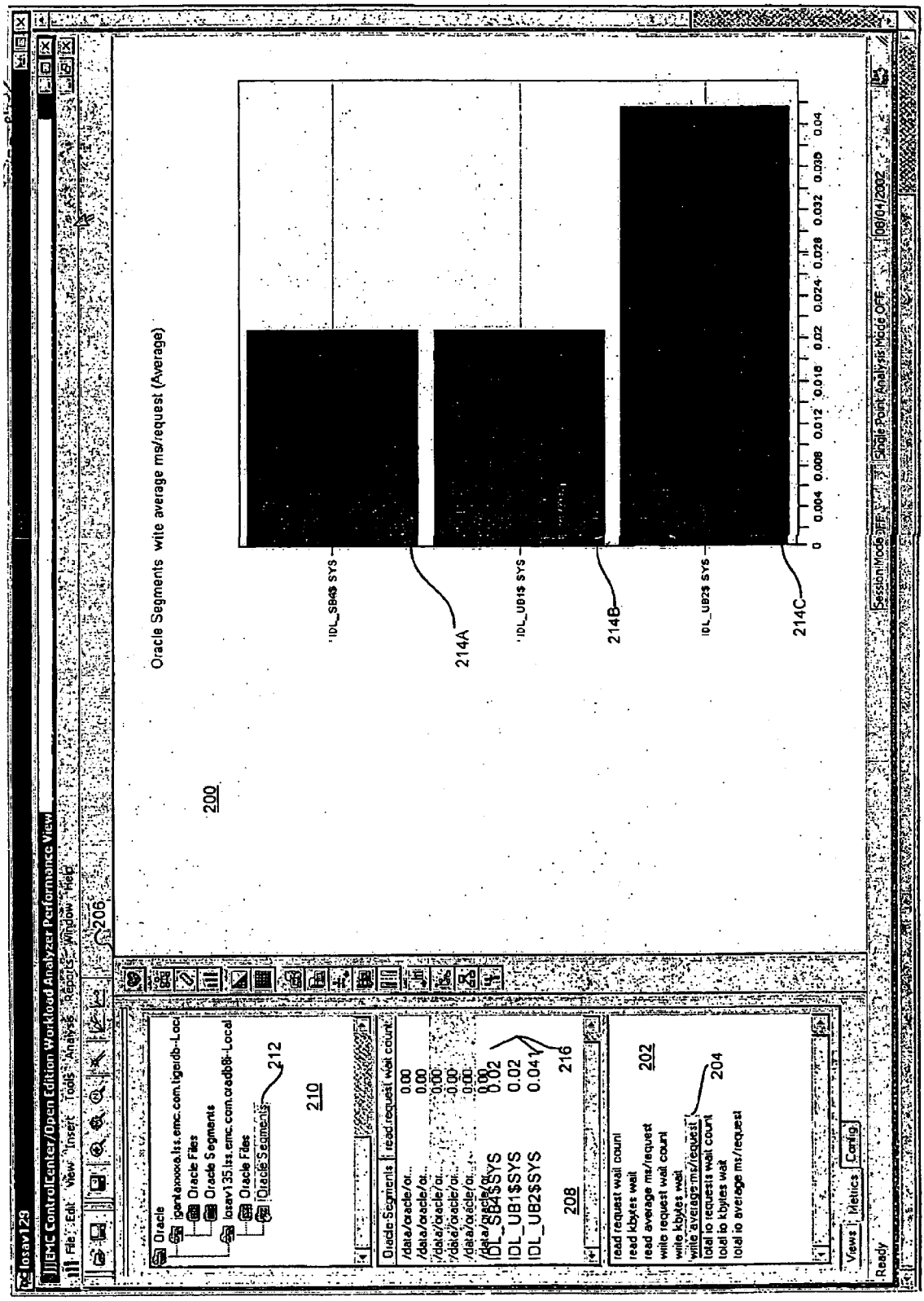
FIG. 7 shows an example of an output report for average write time.

FIG. 7 shows an example of an output report generated by the report output writer 36 for average write time per request. Referring to FIGS. 7 and 2, a display screen 200 for average MS/request is shown. A display type window 202 shows the type of transactions illustrated in a histogram window 206, as shown by type selection 204 in the type window 202. An object window 208 shows the database objects (segments) for which the histogram window 206 displays performance characteristics. A volume selection window 210 shows the volume that contains the database objects in the object window 208. Selected volume 212 is underlined to indicate that segments on "losav135" are selected for analysis.

In the histogram window 206, histogram bars 214A–214C are shown, corresponding respectively to the wait count values 216 shown in the object window 208 for the respective objects. From the histogram, an operator may observe that segment IDL_UB2$ SYS 214C appears to be most burdened, having an average wait time of 0.041 ms, as compared to 0.02 ms for segments 214A and 214B.

Figure 8:
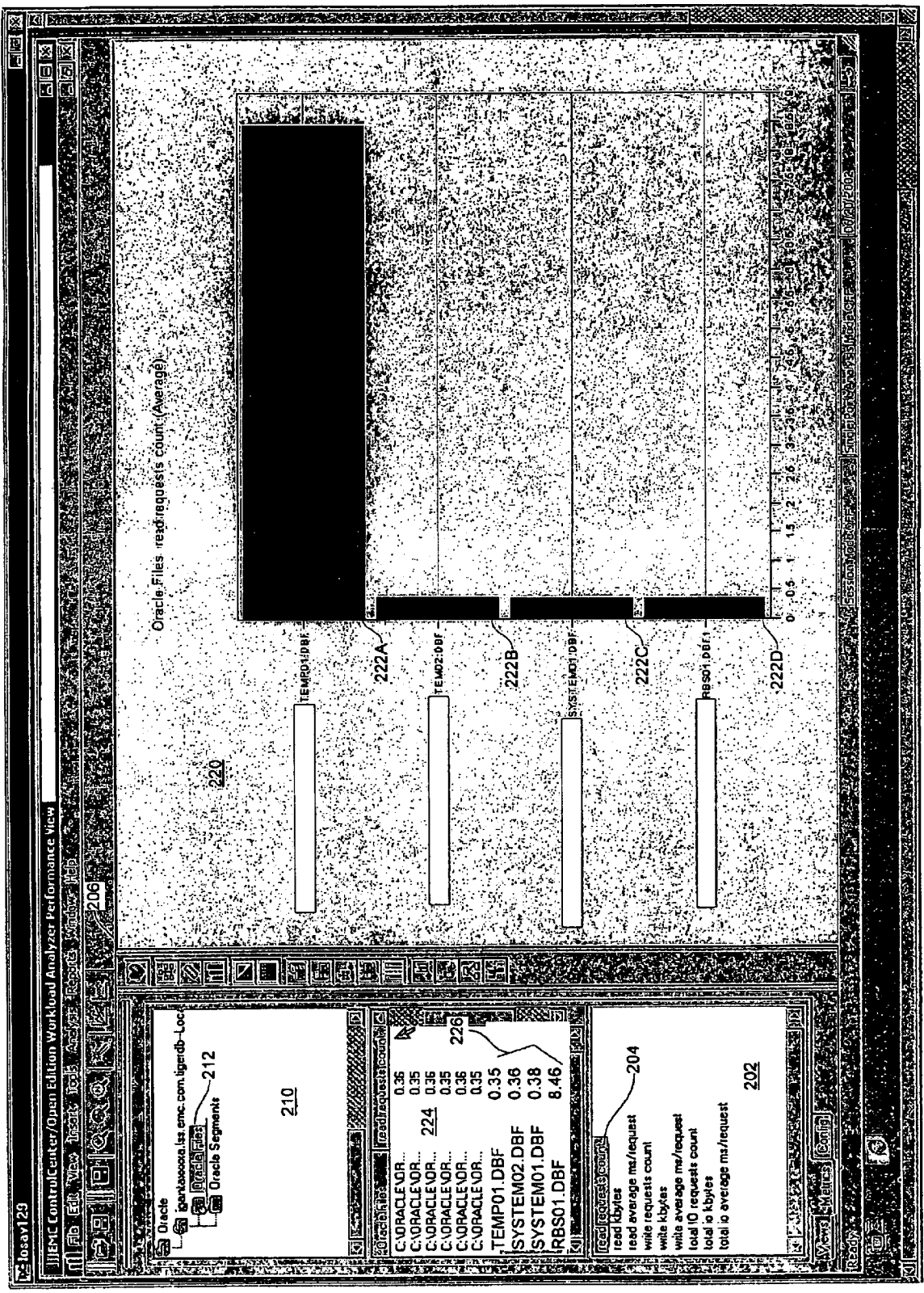
FIG. 8 shows an example of an output report for average pending queue read request counts.

FIG. 8 shows an example of an output report for average pending queue read request counts. Referring to FIGS. 8 and 2, another display window 220 is shown. The type window 202 indicates that the histogram window 206 displays read requests count, as shown by selection 204. The volume selection window 210 indicates a selection of files 212 in volume "igantaxxxx." A file selection window 224 indicates selected files 226 shown on the histogram window 206. The histogram values 222A–222D displayed, corresponding to the selected files 226, indicates that TEMP01.DBF 222A has a read requests value of 8.46, substantially higher than the remaining histogram values 222B–222D.

FIGS. 9A–9E and 10 show an example of database performance characteristics gathering and analysis from successive samples. Referring to FIGS. 9A–9E, 10, 3 and 4, a pending request entry T1 302A corresponding to a write transaction arrives from a user process 14.' The entry indicates a write request of 1K to DB Table T1 30C. The corresponding scope structure 304 includes fields Transaction ID 30A of T1, Write Request Count 30J of 1, Write Kbytes(size) 30K of 1K, and Write Time in Queue 30L of 0 milliseconds.

As this request 302A is the only queued request, the current sampling 302 is completed and the aggregating component 28 updates the global accumulator 306 by writing the scope record 304. Following a sleep interval, another sampling 308 is taken at time t=20 milliseconds. Referring to FIG. 9B, the user process 14' has sent another transaction request, and accordingly, queue entry 308 has an entry for transaction T2 308B. Further, as T1 has not been satisfied, it remains as entry 308A. Transaction T2 308B is a write request also for DB Table TB1 30C for 3K, and includes the transaction parameters of Write Request Count 30J of 1, Write Kbytes(size) 30K of 3K, and Write Time in Queue 30L of 0 milliseconds, as indicated by the scope records 310 and 312. The aggregating component 28 updates the global accumulator 32 accordingly, and another sleep time 62 interval occurs.

Alternatively, the time in queue 30L parameter could be updated from a timestamp in the scope structure, rather than incremented a known quantity based on the sleep time 62 interval.

At time t=40 milliseconds, shown in FIG. 9C the gathering component 26 captures a sample 314 of the queue. No new entries have arrived, nor have pending entries have been satisfied and scope structures 316 and 318 are written to reflect 20 additional milliseconds time in the queue. At time t=60, shown in FIG. 9D a sample 316 of the queue is captured, and indicates that both T1 and T2 have been satisfied. Further, a new entry for T3 has arrived. Accordingly, scope record 320 is written. At the end of another sampling time 58 interval, at t=80 in FIG. 9E, transaction T3 remains, and scope structure 324 is generated to reflect an additional 20 milliseconds in the queue.

However, the end of a sampling frequency cycle 64 has occurred, and therefore the aggregating component 28 updates the global accumulator 32 to reflect the samples taken during the sampling frequency cycle 64. Referring to FIG. 10, the global accumulator 32 entries 328 and 330 are updated to reflect transactions T1, T2 and T3. As transactions T1 and T2 are both directed at DB Table TB1 30C, the total wait time is computed as T1 wait time=40 ms and T2 wait time=20 ms. Accordingly, average wait time=(T1 wait+ T2 wait)/2=(40 ms+20 ms)/2=30 ms. Similarly, average Kbytes are computed as T1 Kbytes+T2 Kbytes/2=(1K+3K)/ 2=2K, as indicated by global accumulator entry 328. Further, global accumulator entry 330 is written to reflect the sole transaction T3 for DB Table TB3.

The sampling of the queues to generate the scope structures can be performed by any suitable means, such as by system service calls of the database management system. In an Oracle® database, for example, the system service call v$session_wait may be employed. Other mechanism for capturing and obtaining snapshots of pending requests will be apparent to those skilled in the art. Further, extensions such as identification of the owner, user, or application from which the most burdensome requests emanate may also be derived from the data accumulated in the global accumulator, without deviating from the scope of the invention as defined by the present claims.

Those skilled in the art should readily appreciate that the programs defining database performance processing as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for database performance processing has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for processing database performance statistics comprising:
    sampling, at a predetermined sampling interval, a set of database performance statistics indicative of pending database requests for access to respective database objects;
    building, for each of the pending database requests, a scope structure including the sampled database performance statistics in the pending database requests to generate a set of snapshots of database requests; and
    aggregating, in a global accumulator having transaction entries indicative of database transactions for the respective database objects, the scope structure of database requests to correlate current pending database requests with transaction entries in the global accumulator corresponding to previous pending database requests for the same transaction for the respective database objects.

2. The method of claim 1 wherein the sampling further comprises
    scanning a queue for the pending database requests; and
    reading the database performance statistics for the entries in the scanned queue.

3. The method of claim 1 wherein the aggregating further comprises:
    indexing the global accumulator with a transaction identifier indicative of the transaction corresponding to the pending database request;
    determining, via the transaction identifier, if a transaction entry in the global accumulator corresponds to the pending transaction; and
    creating, if a corresponding transaction entry is not found in the global accumulator, a new transaction entry corresponding to the pending transaction for a respective database object.

4. The method of claim 1 wherein the aggregating further comprises:
    indexing the global accumulator with a transaction identifier indicative of the pending transaction;
    comparing the database performance statistics corresponding to the same transaction; and
    computing, for each of the database performance statistics corresponding to the same transaction, aggregate parameters indicative of transaction performance for the same transaction.

5. The method of claim 1 further comprising
    analyzing, at a predetermined report interval, the accumulated transactions in the global accumulator to identify transaction performance for transactions related to the respective database objects; and
    generating a report indicative of the analysis of performance for transactions related to the respective database objects.

6. The method of claim 5 wherein the predetermined report interval is 30 minutes.

7. The method of claim 1 wherein the sampling further comprises sampling a subset of selected queues from a plurality of queues corresponding to database instances.

8. The method of claim 1 wherein the sampling further comprises sampling according to a predetermined sampling frequency cycle, the sampling frequency cycle indicative of a periodic window in which to retrieve the database performance statistics.

9. The method of claim 1 further comprising a sleep time interval and wherein sampling further comprises:
    retrieving, for a predetermined sampling time, the database performance statistics; and
    idling for the duration of the sleep time interval such that database performance statistics are not retrieved during the idling.

10. The method of claim 1 wherein the sampling, building, and the aggregating occur during predetermined intervals according to a data collection policy, the data collection policy specifying the predetermined intervals for mitigating intrusiveness of the sampling.

11. The method of claim 10 wherein the data collection policy is indicative of the predetermined intervals such that transactions having substantial impact on database throughput are identified in the sampling and transactions having insubstantial impact on database throughput are omitted from the sampling.

12. The method of claim 1 comprising:
    repeating the steps of sampling, building and aggregating according to an instance sampling sequence, the instance sampling sequence corresponding to a respective database instance, such the global accumulator indicates, for the instance sampling sequence for that respective database instance, transaction performance for transactions occurring during the instance sampling sequence on that respective database instance.

13. The method of claim 12 further comprising:
    repeating the instance sampling sequence for multiple database instances during a database sampling frequency cycle, the database sampling frequency cycle allowing collection of database transaction performance for the multiple database instances for respective database objects, the database sampling frequency cycle occurring repetitively over a database collection report interval.

14. The method of claim 13 further comprising:
    coalescing aggregate parameters for multiple transactions of a similar transaction type for respective database objects from the global accumulator to produce an aggregate result of transaction performance by transaction type for each of the respective database object for each database instance; and
    presenting the aggregate result of transaction performance by transaction type for each respective database object for each database instance to a user such that the user can identify performance characteristics of the database transactions by transaction type for the respective database objects.

15. A workload analysis toolkit for gathering, analyzing and reporting database performance statistics comprising:
    a collection agent operable to sample, at a predetermined sampling time interval, a queue of pending database requests for access to respective database objects, each of the pending database requests indicative of database performance statistics;
    a gathering component in the collection agent operable to build, for each of the pending database requests, a scope structure including the database performance statistics in the pending database requests to generate a scope structure snapshot of database requests; and
    an aggregating component responsive to the collection agent and operable to aggregate, in a global accumulator having transaction entries indicative of database transactions for the respective database objects, the scope structure snapshot of database requests to correlate current pending database requests with transaction entries in the global accumulator corresponding to previous pending database requests for the same transaction for the respective database objects.

16. The toolkit of claim 15 wherein the gathering component is further operable to:
scan the queue for the pending database requests; and
read the database performance statistics for the entries in the scanned queue to generate the scope structure.

17. The toolkit of claim 15 further comprising a transaction identifier, wherein the aggregating component is further operable to:
index the global accumulator with a transaction identifier indicative of the transaction corresponding to the pending database request;
determine, via the transaction identifier, if a transaction entry in the global accumulator corresponds to the pending transaction; and
create, in the global accumulator, a new transaction entry corresponding to the pending transaction for a respective database object.

18. The system of claim 15 further comprising a transaction identifier, wherein the aggregating component is further operable to:
index the global accumulator with a transaction identifier indicative of the pending transaction;
compare the database performance statistics corresponding to the same transaction; and
compute, for each of the database performance statistics corresponding to the same transaction, aggregate parameters indicative of transaction performance for the same transaction.

19. The toolkit of claim 15 further comprising a report writer and a predetermined report interval, the report writer operable to:
analyze, at the predetermined report interval, the accumulated transactions in the global accumulator to identify transaction performance for transactions related to the respective database objects; and
generate a report indicative of the analysis of transaction performance for transactions related to the respective database objects.

20. The toolkit of claim 15 wherein the queue further comprises a plurality of DB instance queues, and the collection agent is further operable to sample a subset of selected queues from the plurality of DB instance queues corresponding to database instances.

21. The toolkit of claim 15 further comprising a predetermined sampling frequency cycle indicative of a periodic window in which to retrieve the database performance statistics, wherein the collection agent is further operable to sample according to the predetermined sampling frequency cycle.

22. The method of claim 15 further comprising a sleep time interval and wherein the collection agent is further operable to
retrieve, for a predetermined sampling time, the database performance statistics; and
idle for the duration of the sleep time interval such that database performance statistics are not retrieved during the idling.

23. The toolkit of claim 15 further comprising a data collection policy having predetermined intervals corresponding to sampling, building, and the aggregating of the database performance statistics such that the predetermined intervals mitigate intrusiveness of the sampling.

24. The toolkit of claim 22 wherein the data collection policy is indicative of the predetermined intervals such that transactions having substantial impact on database throughput are identified in the scope structure snapshot and transactions having insubstantial impact on database throughput are omitted from the scope structure snapshot.

25. The toolkit of claim 15 wherein the aggregating component is further operable to:
repeat the steps of sampling, building and aggregating according to an instance sampling sequence, the instance sampling sequence corresponding to a respective database instance, such the global accumulator indicates, for the instance sampling sequence for that respective database instance, transaction performance for transactions occurring during the instance sampling sequence on that respective database instance.

26. The toolkit of claim 25 wherein the aggregating component is further operable to:
repeat the instance sampling sequence for multiple database instances during a database sampling frequency cycle, the database sampling frequency cycle allowing collection of database transaction performance for the multiple database instances for respective database objects, the database sampling frequency cycle occurring repetitively over a database collection report interval.

27. The toolkit of claim 25 wherein the report output writer is further operable to:
coalesce aggregate parameters for multiple transactions of a similar transaction type for respective database objects from the global accumulator to produce an aggregate result of transaction performance by transaction type for each of the respective database object for each database instance; and
present the aggregate result of transaction performance by transaction type for each respective database object for each database instance to a user such that the user can identify performance characteristics of the database transactions by transaction type for respective database objects.

28. A method for analyzing database performance comprising:
identifying a set of database instances for analysis, each of the database instances having a set of queues corresponding to pending requests;
sampling, during a sampling interval, pending requests in at least some of the queues according to a data collection policy (DCP);
gathering performance parameters indicative of database performance for each of a set of the pending requests;
storing, in a scope structure, the performance parameters indicative of snapshots of pending requests in the sampled queue;
waiting, for the duration of a sleep time interval, a predetermined period prior to subsequent sampling;
aggregating, in a global accumulator, the scope structure snapshots based on a transaction identifier such that subsequent snapshots are correlated with previous scope structure snapshots corresponding to the same pending request, the aggregating further comprising:
creating, if a corresponding transaction identifier is not found for previous scope structure snapshots for the pending request, a global accumulator entry indicative of the transaction; and
updating, if a corresponding transaction identifier is found indicative of previous samples for the pending request, the global accumulator entry corresponding to the pending request;

repeating, according to a sampling frequency, the gathering of the performance parameters; and generating, according to a predetermined archive interval, a report indicative of contention for resources in the database.

29. A computer program product having computer program code for processing database performance statistics comprising:

computer program code for sampling, at a predetermined sampling interval, a set of database performance statistics indicative of pending database requests for access to respective database objects;

computer program code for building, for each of the pending database requests, a scope structure including the sampled database performance statistics in the pending database requests to generate a set of snapshots of database requests; and computer program code for aggregating, in a global accumulator having transaction entries indicative of database transactions for the respective database objects, the scope structure of database requests to correlate current pending database requests with transaction entries in the global accumulator corresponding to previous pending database requests for the same transaction for the respective database objects.

30. A computer data signal having program code for processing database performance statistics comprising:

program code for sampling, at a predetermined sampling interval, a set of database performance statistics indicative of pending database requests for access to respective database objects;

program code for building, for each of the pending database requests, a scope structure including the sampled database performance statistics in the pending database requests to generate a set of snapshots of database requests; and program code for aggregating, in a global accumulator having transaction entries indicative of database transactions for the respective database objects, the scope structure of database requests to correlate current pending database requests with transaction entries in the global accumulator corresponding to previous pending database requests for the same transaction for the respective database objects.

31. A system for processing database performance statistics comprising:

means for sampling, at a predetermined sampling interval, a set of database performance statistics indicative of pending database requests for access to respective database objects;

means for building, for each of the pending database requests, a scope structure including the sampled database performance statistics in the pending database requests to generate a set of snapshots of database requests; and means for aggregating, in a global accumulator having transaction entries indicative of database transactions for the respective database objects, the scope structure of database requests to correlate current pending database requests with transaction entries in the global accumulator corresponding to previous pending database requests for the same transaction for the respective database objects.

\* \* \* \* \*